(12) United States Patent
Holland et al.

(10) Patent No.: US 10,924,753 B2
(45) Date of Patent: Feb. 16, 2021

(54) MODULAR MOTION ESTIMATION AND MODE DECISION ENGINE

(71) Applicant: INTEL CORPORATION, Santa Clara, CA (US)

(72) Inventors: James M. Holland, Folsom, CA (US); Atthar H. Mohammed, Folsom, CA (US); Srinivasan Embar Raghukrishnan, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1274 days.

(21) Appl. No.: 14/139,716

(22) Filed: Dec. 23, 2013

(65) Prior Publication Data

US 2015/0181209 A1 Jun. 25, 2015

(51) Int. Cl.
*H04N 19/436* (2014.01)
*H04N 19/577* (2014.01)
*H04N 19/573* (2014.01)
*H04N 19/53* (2014.01)
*H04N 19/58* (2014.01)

(52) U.S. Cl.
CPC ......... *H04N 19/436* (2014.11); *H04N 19/573* (2014.11); *H04N 19/577* (2014.11); *H04N 19/53* (2014.11); *H04N 19/58* (2014.11)

(58) Field of Classification Search
None
See application file for complete search history.

(56) References Cited

U.S. PATENT DOCUMENTS

| | | | | |
|---|---|---|---|---|
| 2009/0168883 | A1* | 7/2009 | Lu | H04N 19/139 375/240.16 |
| 2013/0208796 | A1* | 8/2013 | Amitay | H04N 19/61 375/240.16 |
| 2015/0092855 | A1* | 4/2015 | Chou | H04N 19/105 375/240.16 |
| 2015/0304679 | A1* | 10/2015 | Pasupuleti | H04N 19/43 375/240.16 |

* cited by examiner

*Primary Examiner* — David N Werner
(74) *Attorney, Agent, or Firm* — Kacvinsky Daisak Bluni PLLC

(57) ABSTRACT

An apparatus may include a memory to receive an image frame to encode; and a modular motion estimation engine to process the image frame. The modular motion estimation engine includes modular motion estimation circuitry comprising a multiplicity of motion estimation circuits, and a motion estimation kernel for execution on the modular motion estimation circuitry to send the image frame through one or more configurable execution pipelines that each execute motion estimation over one or more of the motion estimation circuits.

20 Claims, 8 Drawing Sheets

_600_

_602_

_604_

_606_

_608_

_610_

402

MODULAR MOTION ESTIMATION AND MODE DECISION ENGINE

BACKGROUND

In order to transmit visual images from one electronic device to another, visual information is typically encoded and/or compressed to reduce the bandwidth required for transmission or to decrease the time necessary for transmission. One of the common elements of many video encoding or compression schemes is motion estimation. A video or other sequence of visual images is presented as a series of frames. The motion estimation technique exploits redundancy between adjacent frames to achieve compression by selecting a frame as a reference and predicting subsequent frames from the reference.

Using the motion estimation technique, the current frame in a sequence of frames is predicted, usually from at least one reference frame. The current frame is divided into macroblocks, such that each macroblock is compared to a region in the reference frame of the same size using an error measure, and the best matching region is selected. The search is conducted over a predetermined search area. A motion vector denoting the displacement of the region in the reference frame with respect to the macroblock in the current frame is determined. When a previous or future frame or both previous and future frames are used as a reference, the prediction is referred to as forward prediction, backward prediction, or bidirectional prediction, respectively.

To reduce computational overhead of macroblock search, a search window within the reference frame may be identified and the macroblock compared to various positions within the search window. An effective yet computationally intensive way of comparing the macroblock to the search window is to compare the pixels of the macroblock to the pixels of the search window at every position that the macroblock may be moved to within the search window. For each position of the block tested within the search window, each pixel of the block is compared to a corresponding pixel in the search window. The comparison comprises computing a deviation between the values of compared pixels.

Moreover, current motion estimation engines may perform multiple sequential processing operations to an input image frame including performing of integer motion estimation (IME), fractional motion estimation (FME), bidirectional motion estimation (BME), and other processing operations. For example, IME may be performed, followed by FME, and so forth. This processing of an input image frame may thus proceed along an execution pipeline that contains a single point of entry and single point of exit that results in the finalized output from the motion estimation engine. As a result motion estimation may consume a large fraction of processor cycles consumed by an encoder and often becomes a bottleneck for image processing by encoders.

It is with respect to these and other considerations that the present improvements have been needed.

DETAILED DESCRIPTION

The present embodiments provide improved architecture and techniques for performing motion estimation of media that contain multiple image frames. The present embodiments particularly apply to motion estimation for video encoding, video conferencing, image stabilization, and frame rate conversion, among others. As detailed below a modular motion estimation engine is disclosed that contains modular hardware components to perform different techniques for a motion estimation of image frames such as video frames. In various embodiments, the modularity of motion estimation hardware provides a flexible and diverse set of algorithms that may be applied to a wide variety of workloads beyond video encoding.

In some embodiments, the modular motion estimation engine may be harnessed to process an image frame via multiple parallel execution pipelines. In other embodiments, the modular motion estimation engine provides a configurable architecture in which novel execution pipelines are generated and novel operations performed during the motion estimation procedure. Such configurable architecture allows different combinations of hardware-based motion estimation circuits to be harnessed to synthesize a given execution pipeline or combination of execution pipelines. Other embodiments entail use of an advanced skip check engine having forward transform capabilities, hardware assisted multi-reference search support, hardware accelerated chroma intra frame prediction, hardware accelerated chroma inter frame prediction, and use of weighted sum of absolute differences (SAD) procedure for true motion estimation.

The present embodiments also provide flexibility to adapt motion estimation to different workloads including image stabilization, frame rate conversion, gesture tracking, and other tasks.

Figure 1:
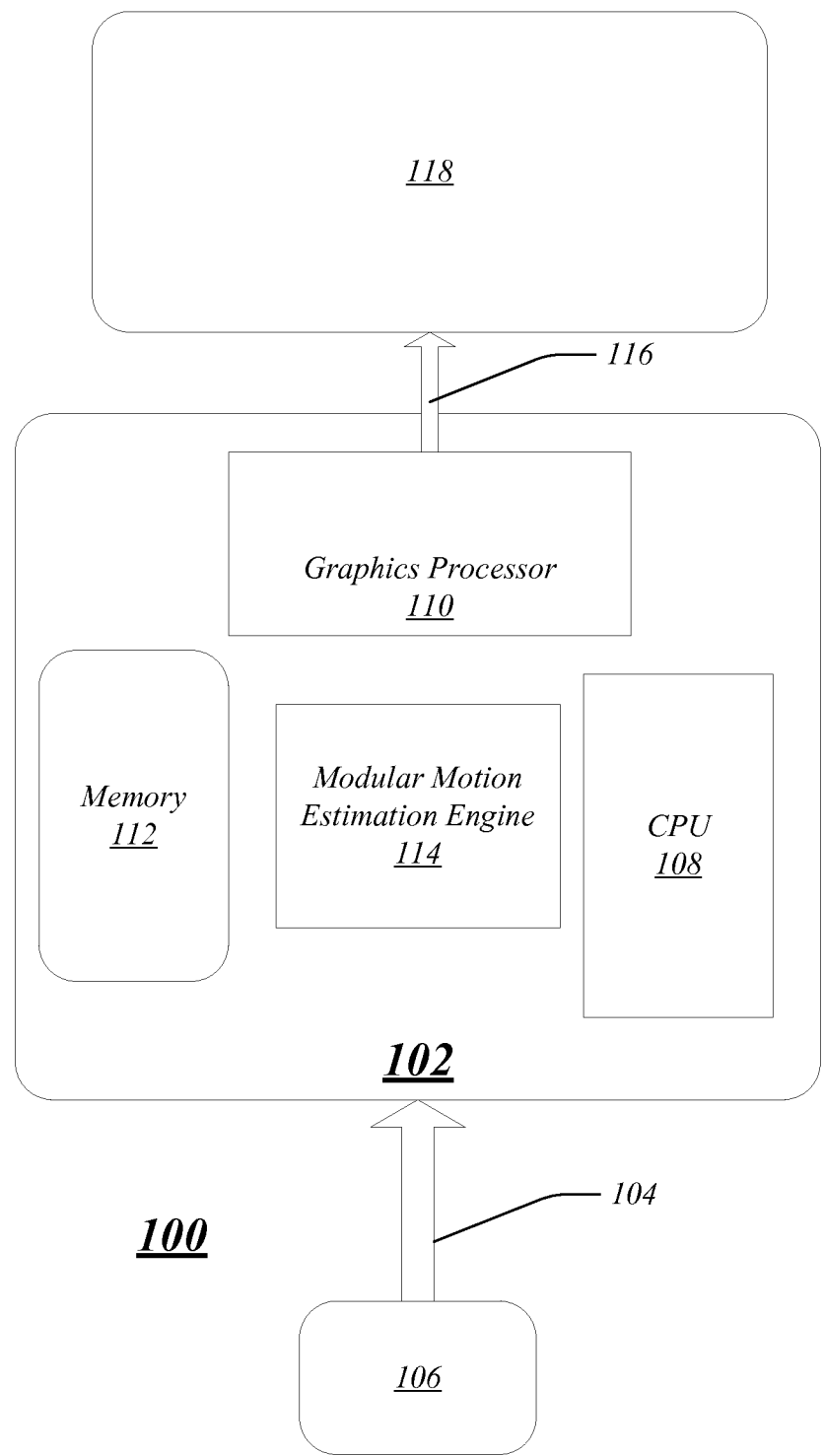
FIG. 1 depicts one exemplary architecture.

FIG. 1 depicts an exemplary architecture 100 for performing motion estimation of image frames. In the architecture 100 a device 102 may receive media content 104 from a source 106 for processing. The media content 104 may be video in various embodiments, which may be processed as a series of video frames to perform motion estimation. The device 102 may output the processed media content 116 to a target 118, which may be an external device, a digital display, or other device to consume the processed media content 116. In embodiments of video encoding, the processed media content 116 may be encoded video.

As further shown in FIG. 1, the device 102 includes a general purpose processor (CPU) 108, graphics processor 110, and memory 112. During motion estimation, the memory 112, which may be a buffer, may receive multiple image frames of a media such as video to be processed. In various embodiments these components and others may be embodied in a platform such as a as a mobile phone, smartphone, tablet computer, laptop computer or other mobile device, desktop computer, video game device, television, or hybrid communications/computing device. In some embodiments the device 102 may be a system-on-chip in which the components shown therein are embodied in a single semiconductor die. The embodiments are not limited in this context.

The device 102 additionally includes a modular motion estimation engine 114 whose operation is detailed with respect to the figures to follow. In brief, however, the modular motion estimation engine 114 may process the media content 104 received by device 102 to accelerate motion estimation in a manner that is tailored to the media content 104 or other features. This provides a more flexible approach for motion estimation in comparison to conventional hardware-managed motion estimation that employs rigid pipelines.

The modular motion estimation engine 114 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
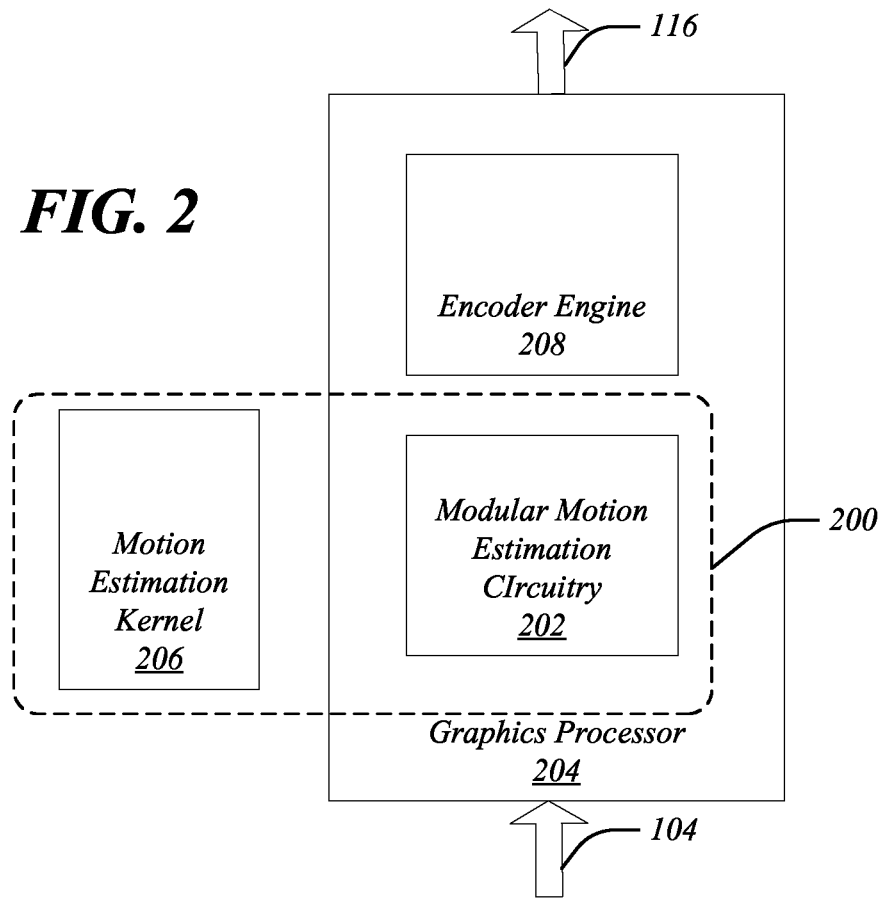
FIG. 2 shows details of a modular motion estimation engine consistent with various embodiments.

FIG. 2 depicts details of a modular motion estimation engine 200 consistent with various embodiments. The modular motion estimation engine 200 includes modular motion estimation circuitry 202, which is located in a graphics processor 204. The modular motion estimation engine 200 further includes a motion estimation kernel 206, which may act in concert with the modular motion estimation circuitry 202 to perform motion estimation as detailed below. In embodiments of video encoding additional circuitry such as an encoding engine 208 may operate on the input media content in conjunction with the modular motion estimation engine 200 to output the processed media content 116 as encoded video.

Figure 3:
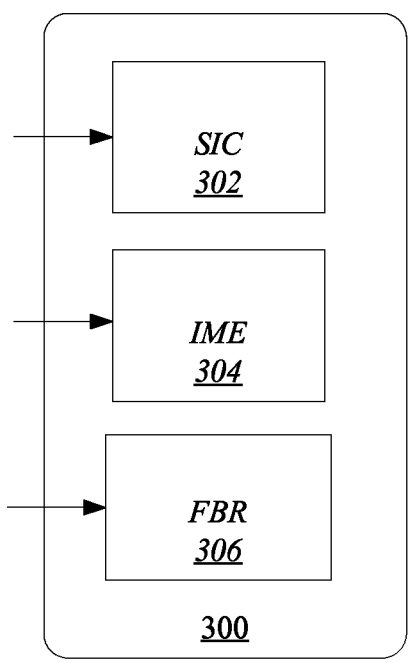
FIG. 3 depicts one embodiment of modular motion estimation circuitry.

FIG. 3 depicts one embodiment of a modular motion estimation circuitry 300. In various embodiments the modular motion estimation circuitry 300 may be hardware circuitry that is included in a standalone graphics processor, system-on-a-chip die, or in other circuitry that is in communication with graphics processor circuitry. As shown in the example of FIG. 3 the modular motion estimation circuitry 300 includes a set of different motion estimation hardware circuits, termed herein "motion estimation circuits" that may perform different functions. The motion estimation circuits include a skip check/intra frame prediction circuit (SIC) 302, an integer motion estimation circuit (IME) 304, and a fractional/bidirectional prediction circuit (306). The architecture of the modular motion estimation circuitry 300 is such that any or all of the individual motion estimation circuits 302, 304, 306 may be harnessed to perform motion estimation for a given workload, or for a given set of image frames within a workload.

The SIC circuit 302 may, for example, perform skip check functions for a given media. As a matter of background in conventional motion estimation procedures a set of motion vectors is output to specify relative motion of objects within an image frame, typically at the macroblock level, which may range in size from 4×4 pixels to 16×16 pixels in common implementations. Many encoders employ the skip mode to more efficiently process components of a frame such as macroblocks. Prediction modes that are often used to remove temporal redundancy include skip check mode or skip mode. In a skip check mode no motion vector information for a given macroblock may be generated at all. This is particularly efficient when sequences of image frames generate no motion at all or motion can be described by a translational model alone.

The SIC circuit 302 may also perform intra frame prediction in which a given macroblock may be processed based upon information in the current image frame that contains the macroblock and not relative to other image frames.

The IME circuit 304 may be employed to carry out integer motion estimation, in which sample values of a macroblock in a current image frame are compared with that of integer pixels in a search area of a reference image frame. The IME circuit 304 may be employed in conjunction with an inter frame prediction process in which the macroblock of the current frame is compared to a block region in a previous frame using a block match algorithm to determine a match. This procedure by its nature, may yield accurate motion estimation results, but also is computationally intensive.

The FBR circuit 306 may be employed to perform fractional motion estimation, bi-directional motion estimation, or both fractional motion estimation and bi-directional motion estimation. In conventional motion estimation procedures, bidirectional motion estimation and fractional motion estimation are both used to create a better match between macroblocks in a current frame and macroblocks in previous or future reference frames.

As a matter of background, the use of fractional motion estimation may be appropriate, for example, when motion between adjacent image frames in a sequence of image frames is sufficiently small that displacements of given object are less than one pixel in dimension. Motion estimation may therefore be performed at the half-pixel level or quarter pixel level, for example. The resultant motion vectors may therefore be calculated at the given sub-pixel level ($\frac{1}{2}$, $\frac{1}{4}$, $\frac{1}{8}$, and so forth). Since the image is enlarged in this process, interpolation is performed.

In bidirectional motion estimation a future reference image frame and past reference image frame, or an average of both future and past reference image frame may be used to generate a final prediction error. The use of the FBR circuit 306 may therefore improve accuracy of motion estimation and thereby accuracy of video compression in embodiments of video encoding. However, bidirectional motion estimation also increases the compression overhead, or the amount of time needed to complete the motion estimation phase. Likewise, completing fractional motion estimation may increase the time that is needed to complete the motion estimation.

The modular motion estimation circuitry 300, however, splits the aforementioned motion estimation functions into three different hardware modules that are individually addressable. Thus, each of the SIC circuit 302, IME circuit 304, and FBR circuit 306 may be individually selected for processing of a given macroblock. Thus, the modular motion estimation circuitry 300 contains multiple entry points to receive a macroblock to process and a multiple exit points to generate motion estimation output. In this manner different combinations of motion estimation circuits of the modular motion estimation circuitry 300 may be selected for different workloads, or different image frames of a workload, or different macroblocks within an image frame.

Although FIG. 3 depicts three different modules, it is noted that in some embodiments, circuitry may be provided to perform skip check that is different from circuitry to perform intra mode prediction. In addition, separate circuitry may also be provided to perform bidirectional motion estimation as opposed to circuitry used to perform fractional mode motion estimation.

Figure 4:
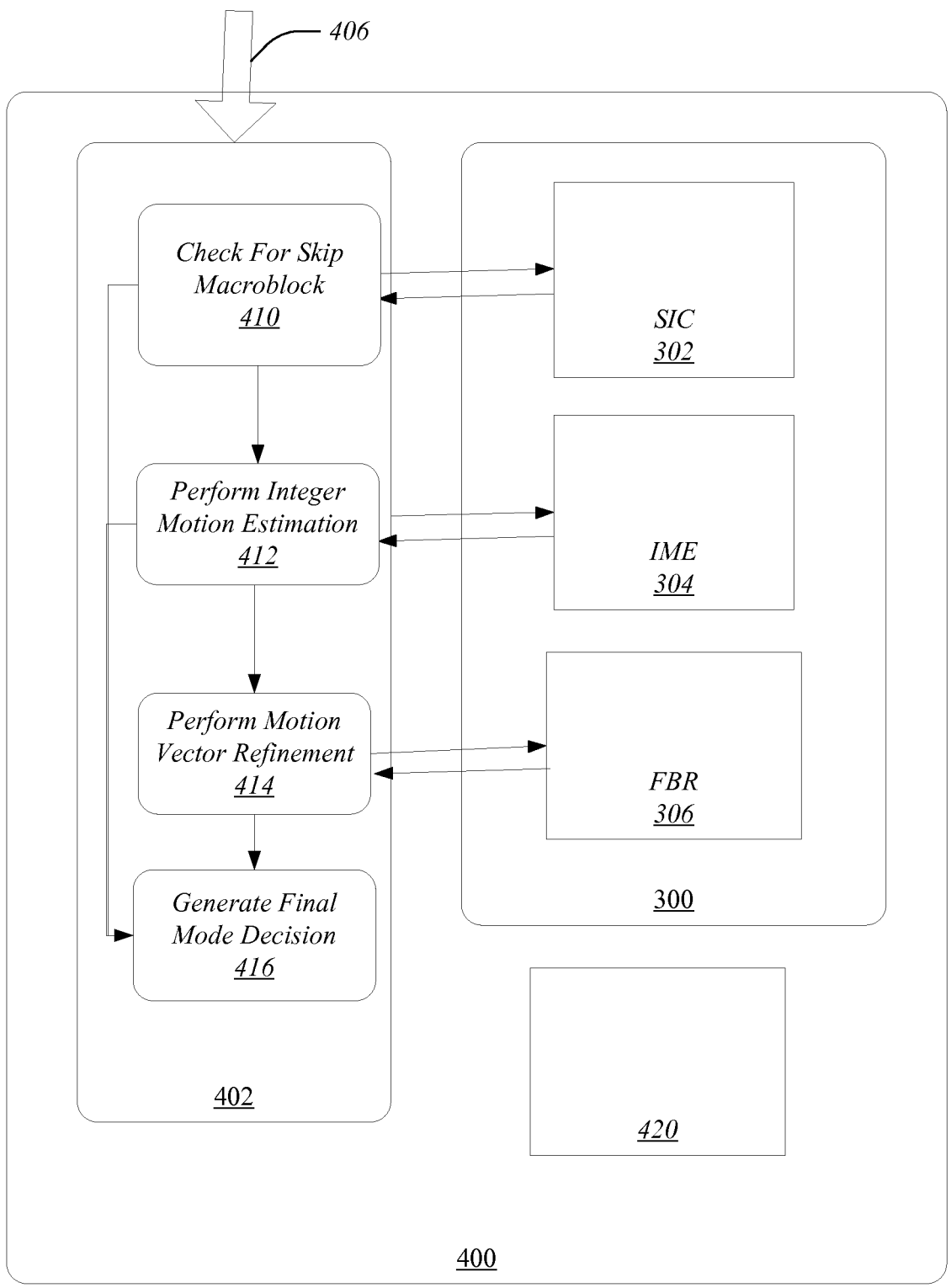
FIG. 4 depicts operation of a modular motion estimation engine according to an embodiment.

FIG. 4 depicts one example of implementation of motion estimation using the modular motion estimation circuitry 300 according to an embodiment of the disclosure. In this example a modular motion estimation engine 400 includes a motion estimation kernel 402 that executes on the modular motion estimation circuitry 300. The motion estimation kernel 402 may constitute software that schedules motion estimation processing of input image frames through various hardware components in the modular motion estimation circuitry.

As further illustrated in FIG. 4, the modular motion estimation engine 400 includes a mode decision engine 420 which may receive output from the results of motion estimation processing received from the various hardware components, such as SIC circuit 302, IME circuit 304, and FBR circuit 306. The mode decision engine 420 may use the output to determine encoding cost of each different modes that might be applied to encode the image frame in question. This may result in selection of the mode that exhibits least cost in one implementation. However, other criteria including speed of execution may inform the mode decision taken.

As shown in FIG. 4, the motion estimation kernel 402 may generate a series of operations in conjunction with the modular motion estimation circuitry 300. When input such as a macroblock 406 is received the motion estimation kernel 402 may send the macroblock 406 for processing along different paths or execution pipelines. The different execution pipelines each involve processing a macroblock for motion estimation via one or more of the motion estimation circuits. In particular FIG. 4 illustrates an implementation in which one or more of the motion estimation circuits may be bypassed during motion estimation. For example, the motion estimation kernel 402 may execute the operation 410 on the SIC circuit 302. If the results returned to the motion estimation kernel 402 indicates a skip checking is best for a given macroblock, the motion estimation kernel 402 may bypass execution on the IME circuit 304 and FBR circuit 306. The motion estimation kernel 402 may then proceed to operation 416 where a final mode decision is made.

Alternatively, subsequently to operation 410 the motion estimation kernel 402 may proceed to execute the operation 412 on the integer motion estimation circuit 304 to perform integer motion estimation. Depending upon the results returned, the motion estimation kernel 402 may bypass execution on the FBR circuit 306 and may instead proceed to operation 416 where a final mode decision is made based upon the results returned from the operations 410 and 412 executed over the respective SCI circuit 302 and IME circuit 304.

If a decision is made to proceed to the operation 414, the motion estimation kernel 402 may then execute a motion vector refinement on the FBR circuit 306. Subsequently after the results returned, the motion estimation kernel 402 may then proceed to operation 416 in which the final mode decision is based upon the results returned from processing the macroblock 406 through operations on SIC circuit 302, IME circuit 304, and FBR circuit 306.

It can be seen from the example of FIG. 4 that multiple execution paths or pipelines are afforded by the modular motion estimation engine 400 for performing motion estimation for a given image frame. These execution paths may be deemed to be configurable in that a different execution path can be performed according to the demands of the given workload or image frame. Moreover, the modular nature of the hardware of modular motion estimation circuitry 300 affords the ability to establish parallel execution pipelines.

Figure 5:
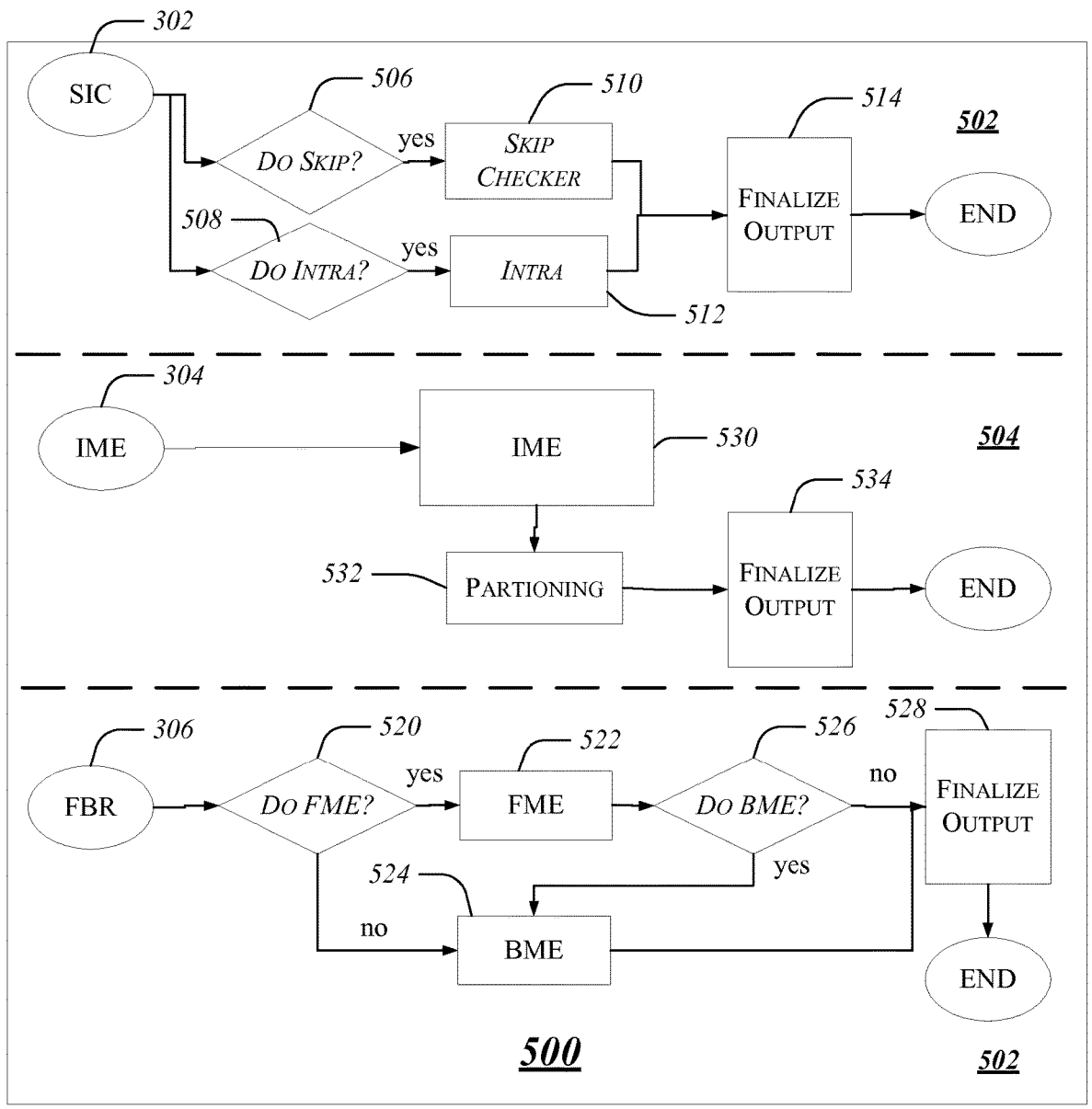
FIG. 5 depicts details of operation of a modular motion estimation engine according to an embodiment.

Consistent with additional embodiments, FIG. 5 depicts further details of operation of a modular motion estimation engine such as modular motion estimation engine 400. In the example shown in FIG. 5 the execution architecture 500 for a modular motion estimation engine 400 involves performing estimation over two parallel execution pipelines, one a (check and refinement motion estimation) CRE execution pipeline 502 and a second IME pipeline 504. As illustrated in FIG. 5, the modular motion estimation engine 400 may execute a series of operations using the SIC circuit 302 on an input macroblock (not shown). A first operation, beginning with decision block 506 is a determination of whether to perform skip check of the current macroblock. In parallel to this the modular motion estimation engine 400 may also determine at decision block 508 whether to perform intra frame motion estimation, which may involve the use of blocks that are already encoded within a current frame of the macroblock in question. If the decision is yes in both cases, the skip check operation 510 and intra frame motion estimation 512 are performed. The results of these operations are processed at the operation 514 where output is finalized from the results of the SIC circuit 302.

The CRE execution pipeline 502 also entails execution on the FBR circuit 306. In decision block 520 if a decision is made in the affirmative the FBR module may perform the fraction motion estimation (FME) as indicated by the operation 522. IF not, then bidirectional motion estimation may be performed at operation 524. If the operation 522 is executed, after the performing of fraction motion estimation at decision block 526 a determination is made as to whether to perform bidirectional motion estimation (BME) subsequently. If so, the operation 524 is performed. Otherwise, the operation 528 is immediately performed in which the output from the FBR circuit 306 is finalized. Thus, the finalized output of the FBR portion of the CRE execution pipeline 502 entails results from fractional motion estimation, bidirectional motion determination or both.

The IME execution pipeline 504 begins when the modular motion estimation engine 400 executes on the IME circuit 304 to perform an integer motion estimation at operation 530. Subsequently, the operation 532 is executed where partitioning takes place. The partitioning may add to computational load of the IME execution pipeline 504 because many possible partitions are possible for treating macroblocks such as macroblocks having a 16×16 pixel size. At operation 528 output is finalized at operation 534 for the IME execution pipeline 504.

As shown by the execution architecture 500 performed by the modular motion estimation engine 400, the CRE execution pipeline 502 and IME pipeline 504 may be processed in parallel, meaning that each execution pipeline has a different entry point and exit point than those of the other execution pipeline, and the output of one execution pipeline does not feed the input of the other execution pipeline. In this manner when a macroblock is input for processing various computationally intensive operations may take place in parallel. The results of the individual execution pipelines may thus be provided in a more timely and efficient manner for final mode decision executed by the modular motion estimation engine 400.

Figure 6:
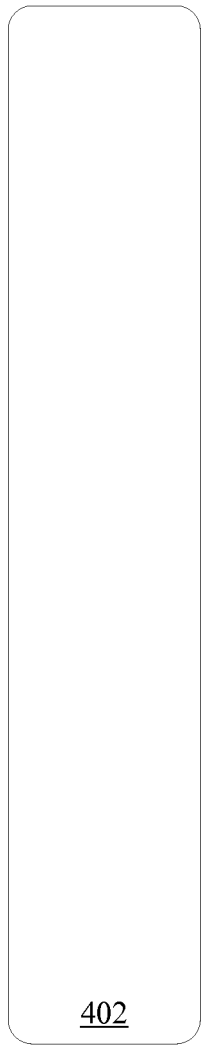
FIG. 6 an exemplary architecture for motion estimation according to an additional embodiment.
Figure 6:
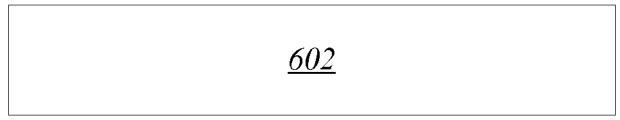
Figure 6:
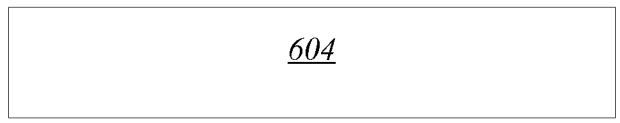
Figure 6:
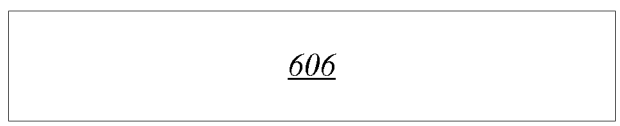
Figure 6:
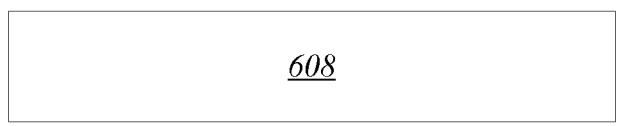
Figure 6:
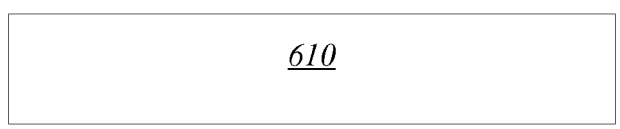

Although the example of FIG. 5 illustrates architecture in which a modular motion estimation engine generates two parallel execution pipelines, in other embodiments, three or more execution pipelines may be generated. FIG. 6 depicts an architecture 600 that includes five execution pipelines 602, 604, 606, 608, 610. In one implementation, the execution pipelines 604 and 608 may be CRE pipelines while the execution pipelines 602, 606, and 610 are IME pipelines. The ability to generate multiple parallel execution pipelines further enhances the flexibility and efficiency for implementing motion estimation over a large variety of workloads. Notably, the execution pipelines 602, 604, 606, 608, 610 are one example of configurable execution pipelines in that they may be generated by the motion estimation kernel 402 and are not fixed for a given modular motion estimation circuitry. Thus, other hardware based execution pipelines are possible for a given modular motion estimation circuitry component. Moreover, a large variety of execution pipelines may be constructed by executing over different hardware motion estimation circuits.

The ability to enlist different motion estimation circuits to support multiple execution paths facilitates hardware assisted multi-reference search, in which multiple reference frames may be employed for motion estimation.

The architecture of modular motion estimation hardware components further facilitates many other novel motion estimation features. For example, intra frame chroma prediction and/or inter frame chroma predication may be accelerated by the use of the modular motion estimation circuitry 300. As in conventional compression schemes, the chroma component of a macroblock refers to the prediction for a chrominance (chroma) sample and is handled separately from a prediction of a luminance (luma) sample. Luminance can be defined as the brightness of an image, and chrominance can be defined as a representation of color difference within an image. The use of modular hardware to accelerate chroma inter prediction or intra prediction may offer special advantages over conventional architecture.

In another example, the modular motion estimation circuitry 300 supports execution of weighted SAD for motion estimation. In one implementation of weighted SAD pixels in a block of a reference frame are quantitatively compared to those in the current frame. The deviations for each macroblock position are then accumulated, and the position within a search window that yields the smallest deviation is selected as the most likely position of the block in the previous frame. The differences in the current and previous positions of the block are then utilized to derive the motion vector to estimate the movement associated with the block between the reference frame and the current frame. As a result of the motion estimation, the motion vector may then, for example, be transmitted as image information instead of a full image frame so that a decoder may render, recreate, or build the current frame by simply applying the motion vector information to the reference frame.

In further embodiments, a modular motion estimation engine may be equipped to dynamically adapt motion estimation to different workloads. For example, based upon received image frames, modular motion estimation 114 may determine the nature of a current workload to involve image stabilization. Accordingly, the modular motion estimation engine 114 may dynamically generate an execution pipeline or set of execution pipelines that are suited for processing the image stabilization task. The execution pipelines may be chosen by harnessing the individual circuits of modular motion estimation circuitry to create novel execution pipelines as generally described above with respect to FIG. 4.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
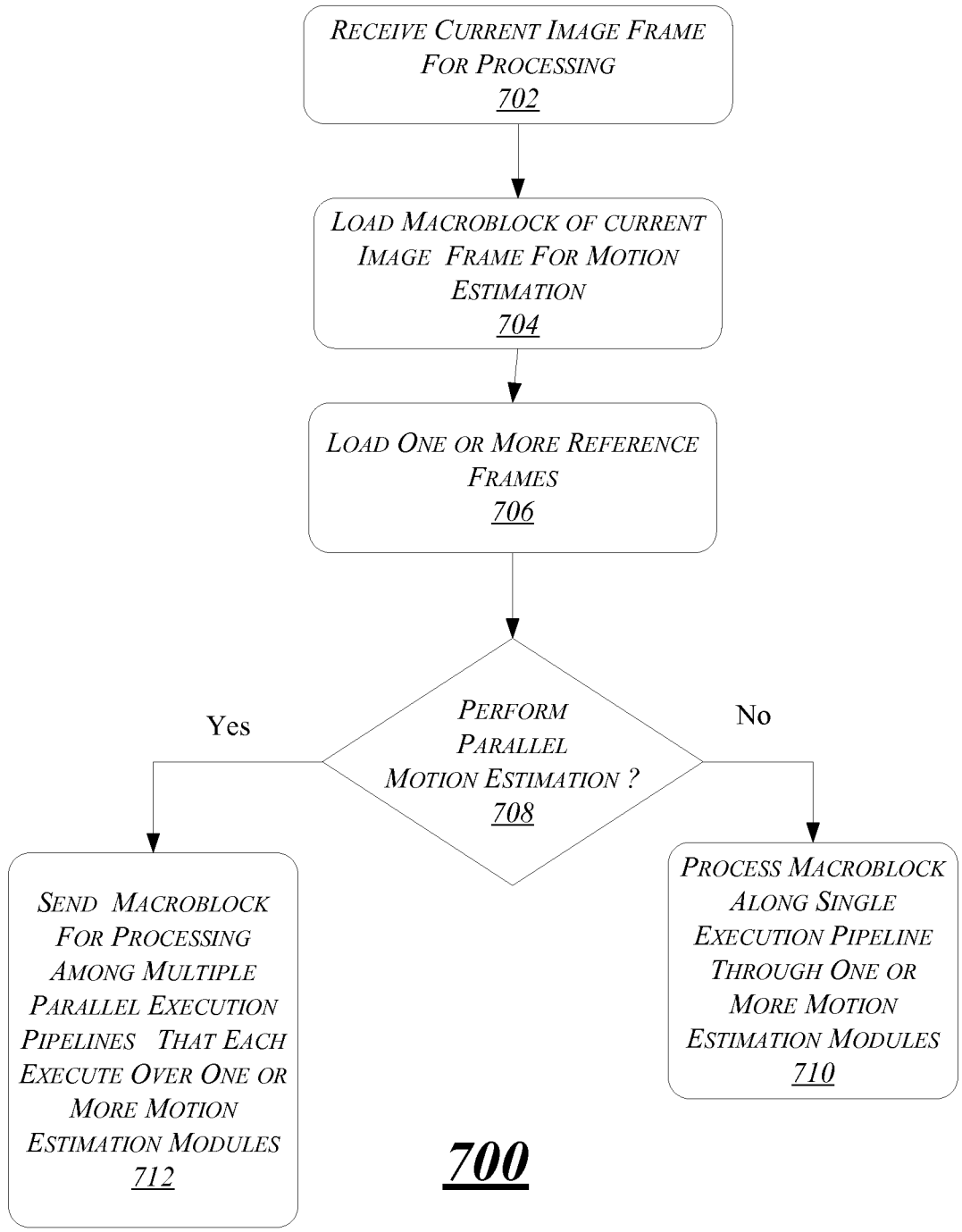
FIG. 7 depicts an exemplary first logic flow.

FIG. 7 illustrates an exemplary first logic flow 700. At block 702, a current image frame is received for processing. The image frame may be a video frame as one example. At block 704 a macroblock of the current image frame is loaded for motion estimation.

At block 706 one or more reference frames are loaded for motion estimation of the macroblock. At block 708 a determination is made as to whether to perform parallel motion estimation. If not, the flow proceeds to block 710 where the macroblock is processed along a single execution pipeline through one or more motion estimation circuits. The motion estimation circuits may include circuitry to perform integer motion estimation, fractional motion estimation, bidirectional motion estimation, skip check, and intra motion estimation, for example.

If, at block 708 a determination is made to perform parallel motion estimation, the flow proceeds to block 712. In the block 712, the macroblock is sent for processing among multiple parallel execution pipelines that each execute over one or more motion estimation circuits.

Figure 8:
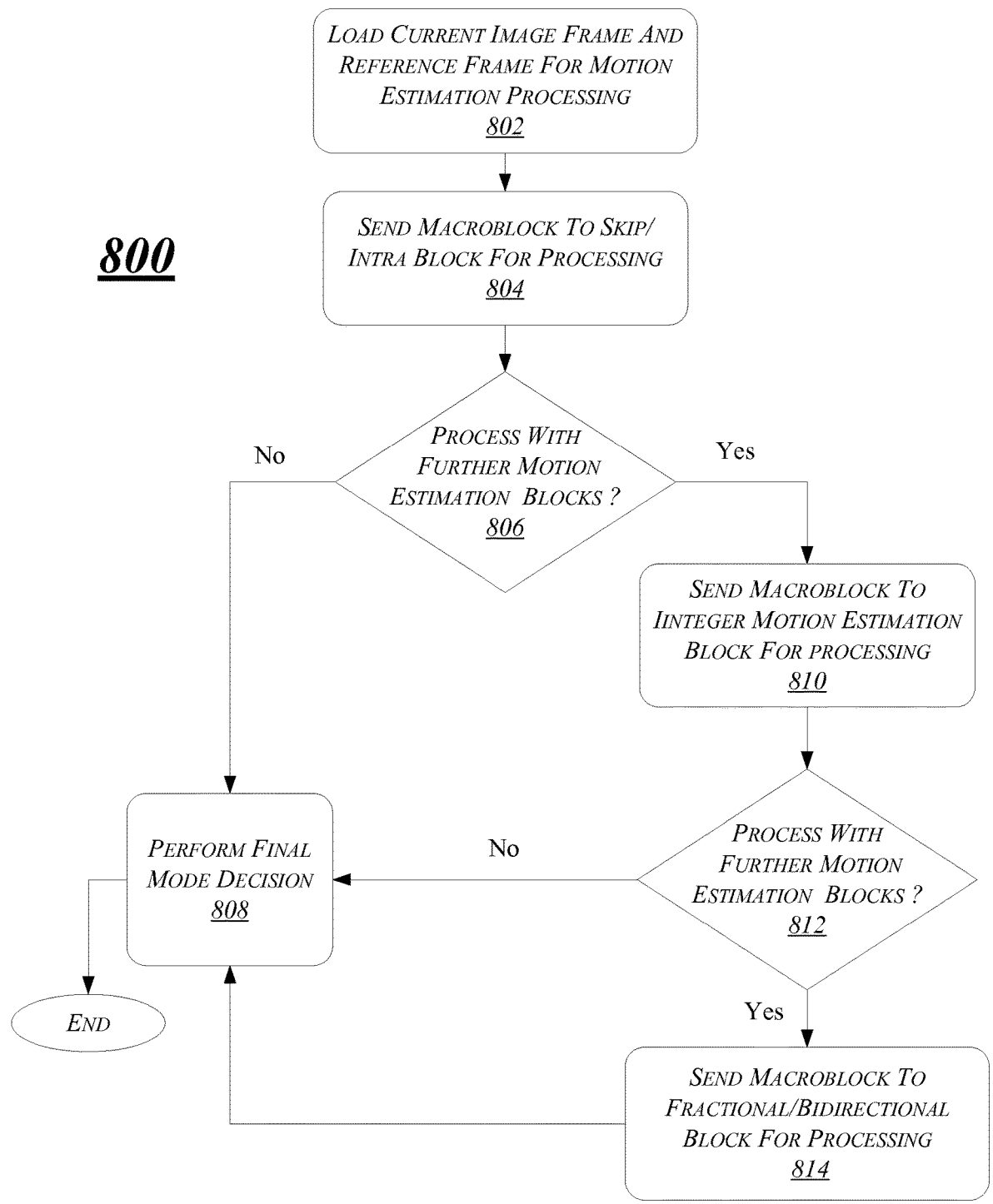
FIG. 8 depicts an exemplary second logic flow.

FIG. 8 depicts an exemplary second logic flow 800. At block 802, a current image frame and reference frame are loaded for motion estimation processing. At block 804, a macroblock of the current image frame is sent to a skip/intra module for processing. The skip/intra module may include circuitry to perform skip check and intra mode prediction for the macroblock.

At the decision block 806 a determination is made as to whether to process the macroblock with further motion estimation circuits after the processing of the macroblock through the skip/intra module. If not the flow proceeds to block 808. At the block 808 a final mode decision is performed for processing the motion estimation of the macroblock. Examples of final mode decision include a decision of intra frame prediction as opposed to inter frame prediction, a decision of use of skip check or not.

If, at decision block 806, a decision is made to continue processing the macroblock with further motion estimation circuits, the flow proceeds to block 810.

At block 810, the macroblock is sent to an integer motion estimation circuit for processing, which may be a dedicated circuitry for performing integer motion estimation.

The flow then proceeds to the decision block 812 where a determination is made as to whether to process the macroblock with additional motion estimation circuits.

At decision block 812, if a determination is made not to employ further motion estimation circuits, the flow moves to block 808 were a final mode decision is performed as described above.

If, at decision block 812 the determination is made to use further motion estimation circuits, the flow proceeds to block 814.

At block 814, the macroblock is sent to a fractional/bidirectional module for motion estimation processing. The fractional/bidirectional module may include common circuitry or two separate circuits to perform fractional motion estimation and bidirectional motion estimation for the macroblock.

Subsequently, the flow proceeds to block 808 where a final mode decision is performed.

Figure 9:
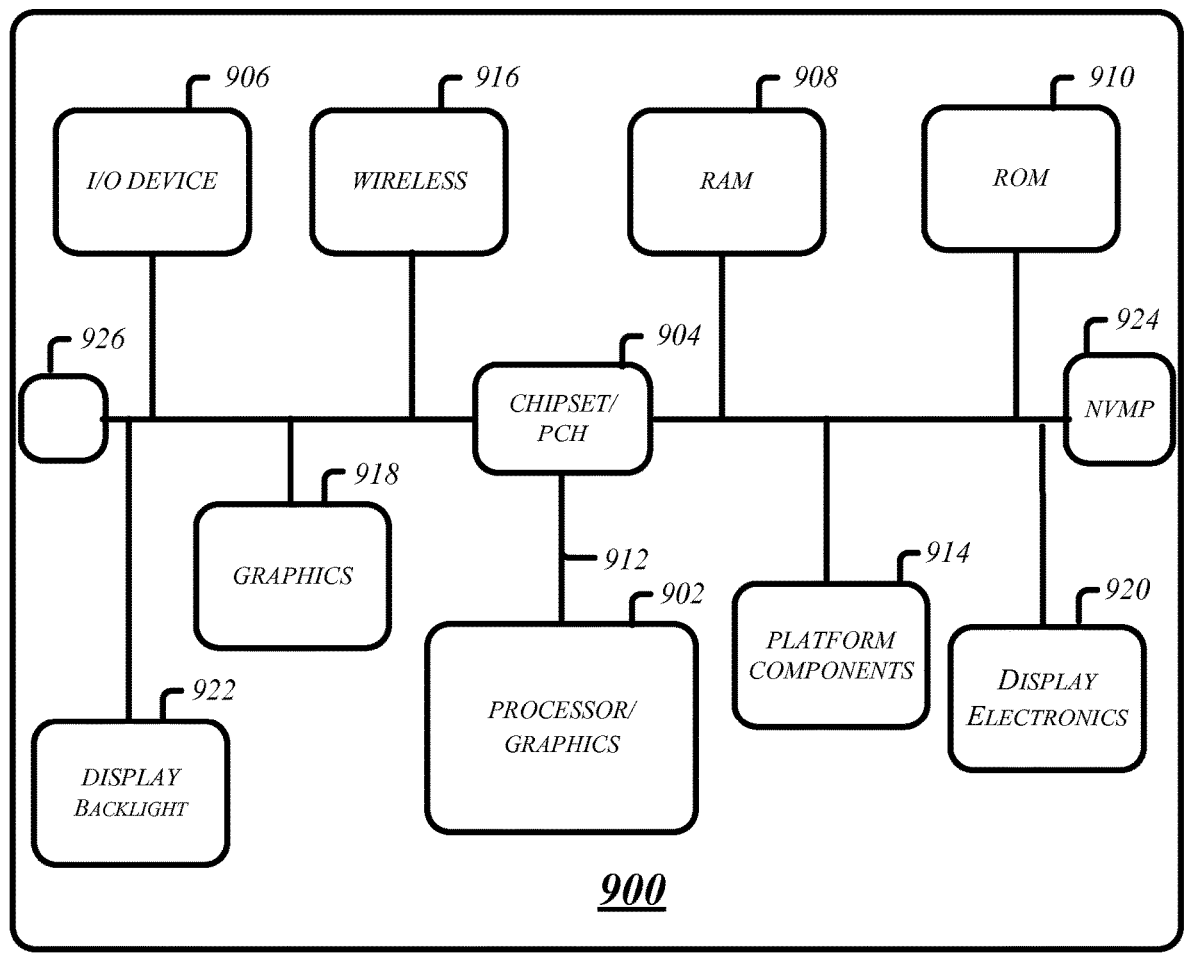
FIG. 9 illustrates an exemplary platform.

FIG. 9 is a diagram of an exemplary system embodiment and in particular, FIG. 9 is a diagram showing a system 900, which may include various elements. For instance, FIG. 9 shows that system (platform) 900 may include a processor/graphics core, termed herein processor 902, a chipset/platform control hub (PCH), termed herein chipset 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918, non-volatile memory port (NVMP) 924, and antenna 926. The embodiments, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 902 may be multiple separate processors located on separate integrated circuit chips. In some embodiments processor 902 may be a processor having integrated graphics, while in other embodiments processor 902 may be a graphics core or cores.

The following examples pertain to further embodiments.

Example 1 is an apparatus for video motion estimation that includes: a memory to receive an image frame to encode; and a modular motion estimation engine to process the image frame, the modular motion estimation engine comprising: modular motion estimation circuitry comprising a multiplicity of motion estimation circuits; and a motion estimation kernel for execution on the modular motion estimation circuitry to send the image frame through one or more configurable execution pipelines that each executes motion estimation over one or more of the motion estimation circuits.

In example 2, the motion estimation kernel of example 1 may be for execution on the modular motion estimation circuitry to generate a multiplicity of parallel execution pipelines to perform motion estimation on the image frame.

In example 3, the one or more configurable execution pipelines of any of examples 1-2 may include one or more integer motion estimation (IME) pipelines and one or more check and refinement motion estimation (CRE) pipelines.

In example 4, the one or more IME pipeline of any of examples 1-3 may comprise execution via an integer motion estimation circuit of the modular motion estimation circuitry, and the one or more CRE pipeline comprising execution via one or more of a skip check module, intra frame estimation module, fractional motion estimation circuit, and bidirectional motion estimation circuit.

In example 5, the one or more motion estimation circuits of any of examples 1-4 may be to process the image frame by comparing a macroblock within the image frame to a block of a reference frame or reference frames using a block matching algorithm.

In example 6, the modular motion estimation circuitry of any of examples 1-5 may comprise a multiplicity of entry points to receive the macroblock and a multiplicity of exit points to generate motion estimation output for the macroblock.

In example 7, the modular motion estimation engine of any of examples 1-6 may comprise a mode decision engine to receive output from the one or more configurable execution pipelines and to select a mode for encoding the image frame based upon the received output.

In example 8, the modular motion estimation circuitry of any of examples 1-7 may comprise a skip check module for forward transform processing.

In example 9, the motion estimation kernel of any of examples 1-8 may be for execution on the modular motion estimation circuitry to perform motion estimation using multi-reference search over multiple reference frames.

In example 10, the motion estimation kernel of any of examples 1-9 may be execution on the modular motion estimation circuitry to perform accelerated chroma intra frame prediction.

In example 11, the motion estimation kernel of any of examples 1-10 may be execution on the modular motion estimation circuitry to perform accelerated chroma inter frame prediction.

In example 12, the motion estimation kernel of any of examples 1-11 may be execution on the modular motion estimation circuitry to perform a weighted sum-of-absolute-differences (SAD) procedure for true motion estimation.

In example 13, the motion estimation kernel of any of examples 1-12 may be execution on the modular motion estimation circuitry to: determine a present workload based upon the image frame and one or more additional image frames; and generate one or more tailored execution pipelines that each executes motion estimation over one or more of the motion estimation circuits and is tailored for processing the present workload.

In example 14, at least one computer-readable storage medium comprises instructions that, when executed, cause a system to generate, responsive to receipt of an image frame, generate signals to send the image frame through one or more configurable execution pipelines that each executes motion estimation over one or more hardware circuits.

In example 15 the at least one computer-readable storage medium of example 14 may comprise instructions that, when executed, cause a system to generate a multiplicity of parallel execution pipelines to perform motion estimation on the image frame.

In example 16, the one or more configurable execution pipelines of any of examples 14 to 15 may comprise one or more integer motion estimation (IME) pipelines and one or more check and refinement motion estimation (CRE) pipelines, the one or more IME pipeline comprising execution via an integer motion estimation circuit of the modular motion estimation circuitry, and the one or more CRE pipeline comprising execution via one or more of a skip check module, intra frame estimation module, fractional motion estimation circuit, and bidirectional motion estimation circuit.

In example 17 the at least one computer-readable storage medium of any of examples 14 to 16 may comprise instructions that, when executed, cause a system to process the image frame by comparing a macroblock within the image frame to a block of a reference frame or reference frames using a block matching algorithm.

In example 18 the at least one computer-readable storage medium of any of examples 14 to 17 may comprise instructions that, when executed, cause a system to: receive output from the one or more configurable execution pipelines; and select a mode for encoding the image frame based upon the received output.

In example 19 the at least one computer-readable storage medium of any of examples 14 to 18 may comprise instructions that, when executed, cause a system to perform motion estimation using multi-reference search over multiple reference frames.

In example 20 the at least one computer-readable storage medium of any of examples 14 to 19 may comprise instructions that, when executed, cause a system to perform accelerated chroma intra frame prediction or perform accelerated chroma inter frame prediction.

Example 21 is a computer implemented method for video motion estimation that comprises: receiving an image frame; and sending the image frame through one or more configurable execution pipelines that each executes motion estimation over one or more hardware circuits.

In example 22, the computer implemented method of example 21 may comprise generating a multiplicity of parallel execution pipelines pipelines to perform motion estimation on the image frame.

In example 23, the one or more configurable execution pipelines of any of examples 21 to 22 may comprise one or more integer motion estimation (IME) pipelines and one or more check and refinement motion estimation (CRE) pipelines, the one or more IME pipeline comprising execution via an integer motion estimation circuit of the modular motion estimation circuitry, and the one or more CRE pipeline comprising execution via one or more of a skip check module, intra frame estimation module, fractional motion estimation circuit, and bidirectional motion estimation circuit.

In example 24, the computer implemented method of any of examples 21 to 23 may comprise: receiving output from the one or more configurable execution pipelines; and selecting a mode for encoding the image frame based upon the received output.

In example 25, the computer implemented method of any of examples 21 to 24 may comprise: determining a present workload based upon the received image frame and one or more additional image frames; and generating one or more tailored execution pipelines that each executes motion estimation over one or more of the motion estimation circuits and is tailored for processing the present workload.

In example 26, the computer implemented method of any of examples 21 to 25 may comprise: performing motion estimation using multi-reference search over multiple reference frames.

In example 27, the computer implemented method of any of examples 21 to 26 may comprise: performing accelerated chroma intra frame prediction.

In example 28, the computer implemented method of any of examples 21 to 27 may comprise: performing accelerated chroma inter frame prediction.

In example 29, the computer implemented method of any of examples 21 to 28 may comprise: performing a weighted sum-of-absolute-differences (SAD) procedure for true motion estimation.

Example 30 is user equipment to perform video motion estimation comprising means to perform the method of any of examples 21 to 29.

Example 31 is an apparatus to perform video motion estimation comprising means to perform the method of any one of examples 21 to 29.

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory to receive an image frame to encode; and
a modular motion estimation engine to process the image frame, the modular motion estimation engine comprising:
modular motion estimation circuitry comprising a multiplicity of individually addressable motion estimation circuits, the one or more motion estimation circuits to process the image frame by comparing a macroblock within the image frame to a block of a reference frame or reference frames using a block matching algorithm, the modular motion estimation circuitry comprising a multiplicity of individually addressed entry points to receive the macroblock and a multiplicity of exit points to generate motion estimation output for the macroblock; and
a motion estimation kernel comprising instructions stored on a non- transitory computer-readable storage medium for execution on the modular motion estimation circuitry to send the image frame through one or more configurable execution pipelines that each executes motion estimation over one or more of the motion estimation circuits, and to perform motion estimation using multi-reference search over multiple reference frames.

2. The apparatus of claim 1, the motion estimation kernel for execution on the modular motion estimation circuitry to generate a multiplicity of parallel execution pipelines to perform motion estimation on the image frame.

3. The apparatus of claim 1, the one or more configurable execution pipelines comprising one or more integer motion estimation (IME) pipelines and one or more check and refinement motion estimation (CRE) pipelines.

4. The apparatus of claim 3, the one or more IME pipeline comprising execution via an integer motion estimation circuit of the modular motion estimation circuitry, and the one or more CRE pipeline comprising execution via one or more of a skip check module, intra frame estimation module, fractional motion estimation circuit, and bidirectional motion estimation circuit.

5. The apparatus of claim 1, the modular motion estimation engine comprising a mode decision engine to receive output from the one or more configurable execution pipelines and to select a mode for encoding the image frame based upon the received output.

6. The apparatus of claim 1, the modular motion estimation circuitry comprising a skip check module for forward transform processing.

7. The apparatus of claim 1, the motion estimation kernel for execution on the modular motion estimation circuitry to perform accelerated chroma intra frame prediction.

8. The apparatus of claim 1, the motion estimation kernel for execution on the modular motion estimation circuitry to perform accelerated chroma inter frame prediction.

9. The apparatus of claim 1, the motion estimation kernel for execution on the modular motion estimation circuitry to perform a weighted sum-of-absolute-differences (SAD) procedure for true motion estimation.

10. The apparatus of claim 1, the motion estimation kernel for execution on the modular motion estimation circuitry to:
determine a present workload based upon the image frame and one or more additional image frames; and
generate one or more tailored execution pipelines that each executes motion estimation over one or more of the motion estimation circuits and is tailored for processing the present workload.

11. At least one non-transitory computer-readable storage medium comprising instructions that, when executed, cause a processor to generate, responsive to receipt of an image frame, signals to send the image frame through one or more of a multiplicity of individually addressable entry points to one or more configurable execution pipelines that each executes motion estimation over one or more hardware circuits, process the image frame by comparing a macroblock within the image frame to a block of a reference frame or reference frames using a block matching algorithm, generate motion estimation output for the macroblock to one or more of a multiplicity of exit points, and to perform motion estimation using multi-reference search over multiple reference frames.

12. The at least one non-transitory computer-readable storage medium of claim 11 comprising instructions that, when executed, cause a processor to generate a multiplicity of parallel execution pipelines to perform motion estimation on the image frame.

13. The at least one non-transitory computer-readable storage medium of claim 11, the one or more configurable execution pipelines comprising one or more integer motion estimation (IME) pipelines and one or more check and refinement motion estimation (CRE) pipelines, the one or more IME pipeline comprising execution via an integer motion estimation circuit of the modular motion estimation circuitry, and the one or more CRE pipeline comprising execution via one or more of a skip check module, intra frame estimation module, fractional motion estimation circuit, and bidirectional motion estimation circuit.

14. The at least one non-transitory computer-readable storage medium of claim 11 comprising instructions that, when executed, cause a processor to:

receive output from the one or more configurable execution pipelines; and select a mode for encoding the image frame based upon the received output.

15. The at least one non-transitory computer-readable storage medium of claim 11 comprising instructions that, when executed, cause a processor to perform accelerated chroma intra frame prediction or perform accelerated chroma inter frame prediction.

16. A computer implemented method, comprising:
receiving an image frame; and
sending the image frame through one or more of a multiplicity of individually addressable entry points to one or more configurable execution pipelines that each executes motion estimation over one or more hardware circuits, process the image frame by comparing a macroblock within the image frame to a block of a reference frame or reference frames using a block matching algorithm, perform motion estimation using multi-reference search over multiple reference frames, and generate motion estimation output for the macroblock to one or more of a multiplicity of exit points.

17. The computer implemented method of claim 16 comprising generating a multiplicity of parallel execution pipelines to perform motion estimation on the image frame.

18. The computer implemented method of claim 16, the one or more configurable execution pipelines comprising one or more integer motion estimation (IME) pipelines and one or more check and refinement motion estimation (CRE) pipelines, the one or more IME pipelines comprising execution via an integer motion estimation circuit of a modular motion estimation circuitry, and the one or more CRE pipelines comprising execution via one or more of a skip check module, intra frame estimation module, fractional motion estimation circuit, and bidirectional motion estimation circuit.

19. The computer implemented method of claim 16 comprising:
receiving output from the one or more configurable execution pipelines; and
selecting a mode for encoding the image frame based upon the received output.

20. The computer implemented method of claim 16, comprising:
determining a present workload based upon the received image frame and one or more additional image frames; and
generating one or more tailored execution pipelines that each executes motion estimation over one or more of the motion estimation circuits and is tailored for processing the present workload.

\* \* \* \* \*